Figure 1:
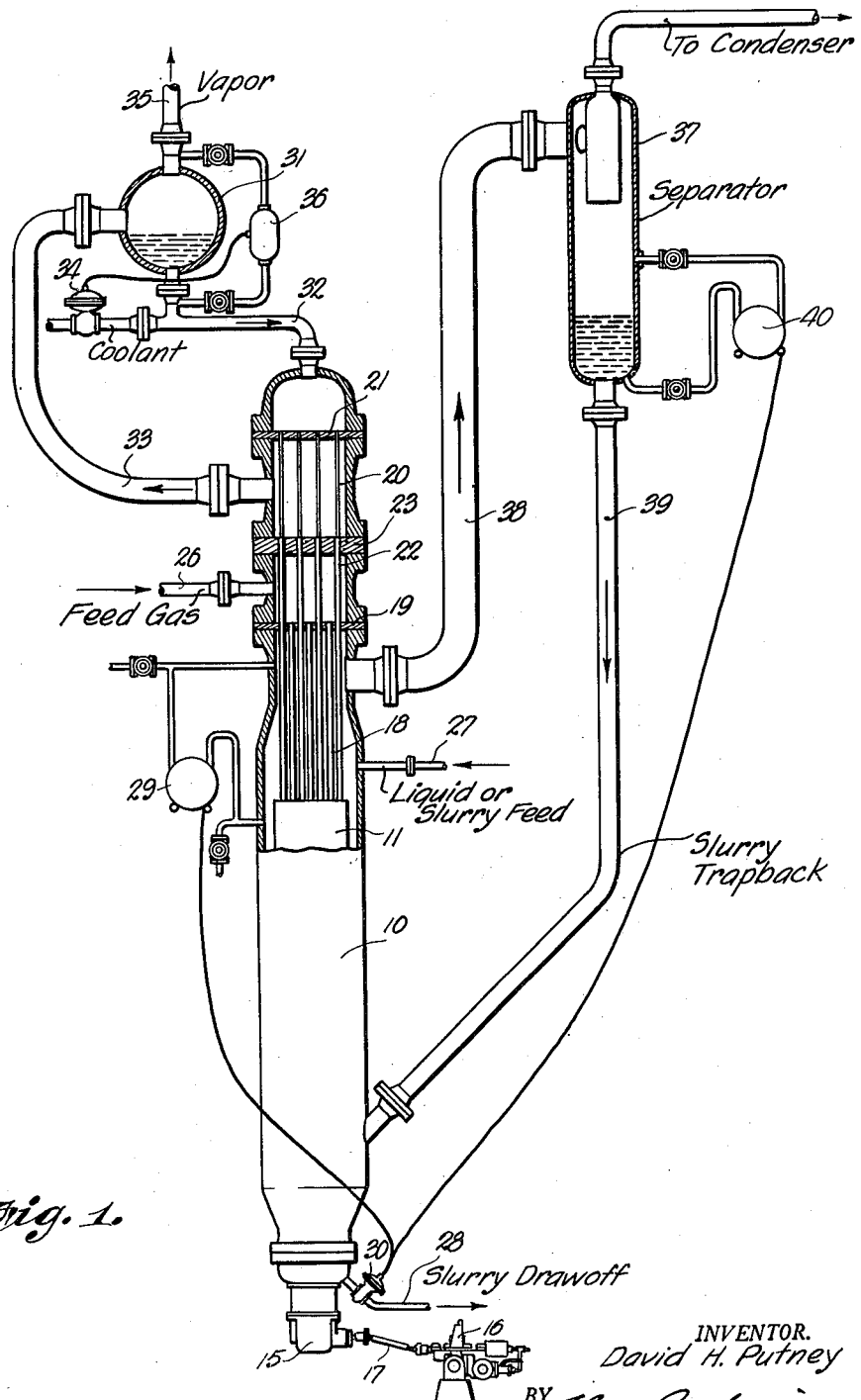

Dec. 18, 1951     D. H. PUTNEY     2,579,203
GAS-LIQUID CONTACTING APPARATUS
Filed Nov. 10, 1948     2 SHEETS—SHEET 2
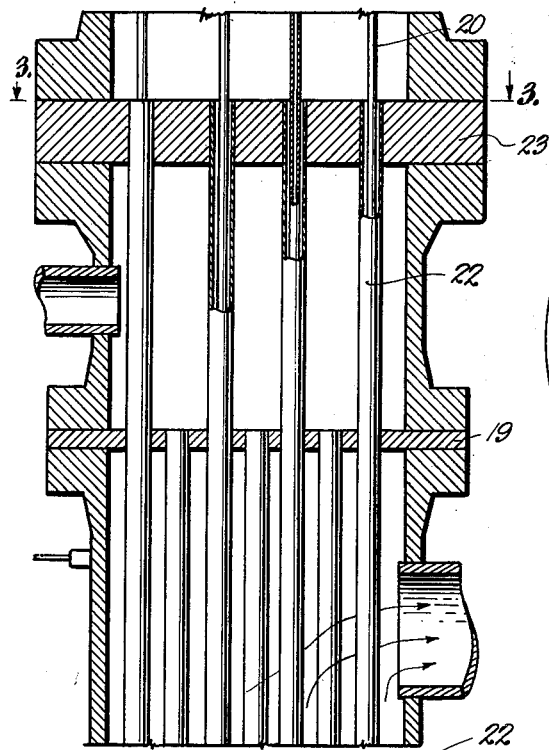
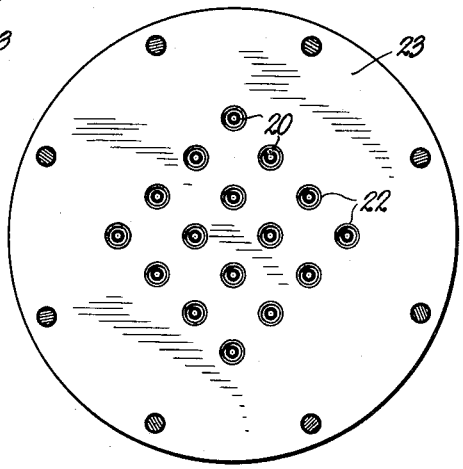
Fig. 3.
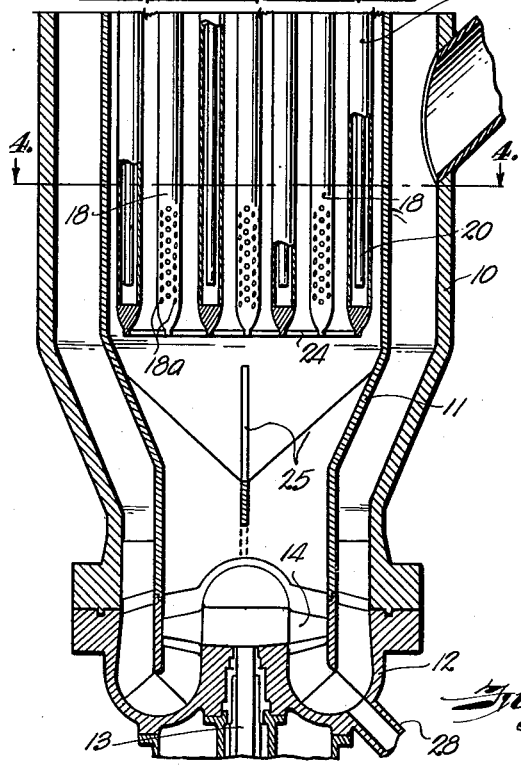
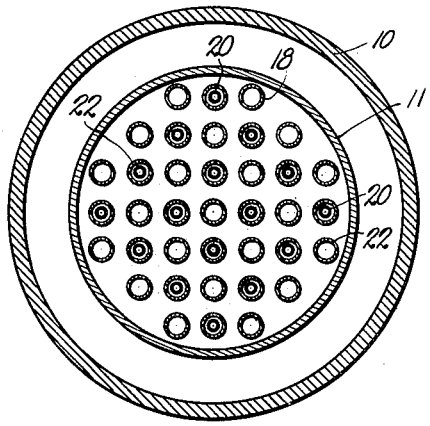
Fig. 4.
Fig. 2.
INVENTOR.
David H. Putney
BY Thos. E. Scofield
ATTORNEY.

Patented Dec. 18, 1951

2,579,203

UNITED STATES PATENT OFFICE 2,579,203

GAS-LIQUID CONTACTING APPARATUS

David H. Putney, Kansas City, Mo., assignor to Stratford Engineering Corporation, Kansas City, Mo., a corporation of Delaware Application November 10, 1948, Serial No. 59,274

2 Claims. (Cl. 261—3)

This invention relates to improvements in a method and apparatus for contacting gases with liquids or liquids with solids and refers more particularly to a mixing device employing a circulating tube wherein fluids are passed at high velocity around and through the circulating tube by means of an impeller. The invention likewise contemplates the introduction of gases to the circulating fluids in a dispersed condition and in a zone where a heat exchange medium is brought in indirect contact with the circulating fluid to remove heat in the event an exothermic reaction occurs and to add heat to an endothermic reaction.

It is recognized that many types of mixers or contacting apparatus have been devised to intimately combine liquids with vapor or liquids with solids. This invention, however, covers a method and apparatus for intimately mixing vapors or gases with liquids or vapors and gases with liquids and solids simultaneously.

There are many chemical processes in which it is necessary to contact gases with liquid catalyst as in alkylation, hydroforming and polymerization. Other processes require the mixing of reactant gases with liquids as in the contacting of olefin gases with sulphuric acid in alcohol manufacture. Other processes require the contacting of reactant gases with solid catalyst held in suspension in a liquid slurry such as in the synthesis of hydrocarbons from carbon monoxide and hydrogen, hydrogenation and the manufacture of aldehydes and alcohols by the oxo process. In most of these processes the reaction is exothermic and large quantities of heat must be absorbed during the reaction. In some processes, however, the reaction is endothermic and heat must be added during the reaction. In practically all processes it is advantageous to control the temperature of the reaction within as narrow limits as possible to obtain greater efficiency and improved results.

Many of the reactions above mentioned are quite rapid and the heat of reaction is released or absorbed depending upon whether the reaction is exothermic or endothermic immediately upon contact of the reactants with the catalyst. If the gas feed is merely bubbled up through a reaction zone containing a body of liquid or slurry the temperature at the point of initial contacting changes considerably with respect to the temperature of the entire mass. Even in reactors where a circulation is established by thermo-syphon or gas lift means the temperature change at the point of contact may be considerable because of the slow circulation established.

One object of the instant invention, therefore, is to provide a means by which a gas can be intimately mixed with and dispersed in a liquid or a liquid solid mixture.

Another object of the invention is to provide a method and apparatus by which reactant gases can be introduced into a mechanically propelled stream of liquid or slurry which is so large and is travelling at such a rapid rate that the endothermic or exothermic reaction can cause only a slight change in the temperature of the mass.

A further object of the invention is to provide means whereby heat can either be removed from or added to a mixture of reactant gases or liquids while the reaction is proceeding.

In the accompanying drawings is shown an apparatus designed to carry out the invention in one of its forms.

Fig. 1 is a diagrammatic view of an apparatus in which the invention may be practiced with parts in section and parts broken away, Fig. 2 is an enlarged section of the mixing reactor disclosing the details of the tubes for introducing gas and circulating the heat exchange medium, Fig. 3 is a view taken along the line 3—3 in Fig. 2 in the direction of the arrows, and Fig. 4 is a view taken along the line 4—4 in Fig. 2 in the direction of the arrows.

Referring to the drawings the reactor consists of a cylindrical vessel 10 in which is positioned concentrically an inner open-ended circulating tube 11. Flanged to the bottom of vessel 10 is a hydraulic head 12 which carries in a suitable bearing shaft 13. Mounted on the upper end of the shaft is an impeller 14. Shaft 13 is driven through suitable gearing contained within casing 15 by turbine 16 through universal connections and propeller shaft 17.

The impeller 14 in the lower end of the inner vessel is of the axial flow type having blades pitched to cause a flow of liquid upwardly through the inner vessel or circulating tube and downwardly in the annular space between the circulating tube and reactor shell 10.

Within the inner vessel is positioned a tube bundle consisting of a number of heating or cooling elements and a number of gas feed distribution tubes. The tubes through which the gas is introduced have been designated by the numeral 18, best shown in Fig. 2. These tubes are hung from tube sheet 19 held between flanges of the shell of the reactor. The heat exchange tubes by which the heating or cooling medium is brought in indirect contact with the reactants are of the lance type. The inner tubes through which the liquid is supplied are numbered 20 and are hung from tube sheet 21 while the outer tubes 22 are hung from tube sheet 23. The lower ends of tubes 22 are closed and the lower ends of tubes 20 are open. The lower ends of both the heat exchange tubes and gas distribution tubes seat in a spacer plate 24 which maintains the tubes in uniform spaced relation.

Straightening vanes 25 located above the impeller within the circulating tube serve to convert turbulence and rotative velocity of the fluids to lineal flow. Gas is fed to the gas distributing tubes 18 through pipe 26 which supplies the feed gas to the reactor between tube sheets 19 and 23. Liquid or slurry fed to the reactor is provided through pipe 27 and a slurry draw-off nozzle 28 is provided in the lower end of the vessel or that portion which we have chosen to term the hydraulic head. A liquid level regulating device 29 having connections into the reactor, one slightly below the top of the circulating tube and the second above the circulating tube, serves to maintain a liquid level by regulation of valve 30 in slurry draw-off line 28.

Fig. 1 illustrates an apparatus suitable for a reaction in which heat is liberated and from which heat must be removed. In this apparatus the flow of a cooling medium is from the reservoir 31 through pipe 32 into the top of the mixing chamber above tube sheet 21. The liquid coolant flows through the inner tubes 20 and is discharged from the bottom of these tubes into the outer tubes 22 wherein the flow is reversed and the cooling medium is discharged into the chamber between tube sheets 21 and 23. This liquid coolant is then passed back to reservoir 31 through pipe 33. Additional coolant is supplied to the cooling system through pipe 34 and vaporized coolant is discharged from the system through pipe 35. A liquid level is maintained in the reservoir 31 by liquid level regulating device 36 operating a valve in line 34. The passage of coolant through the heat exchange tubes is by gas lift or thermo-syphon flow and evaporation of the cooling medium. The surge drum or reservoir 31 separates the vapor from the liquid coolant.

In systems where the reaction is carried out above the boiling temperature of water, water can be used as the refrigerant and steam generated therefrom. In systems operating at low temperatures other cooling media, such as butane, propane, freon, ammonia and the like may be used. In systems where heat must be added to the reaction the arrangement illustrated will not suffice but in these cases a heating medium such as hot oil, molten salt or other media may be circulated through the heat exchange tube bundle from any convenient source.

Mounted above the reactor is a separator 37 which in the drawing is shown as a centrifugal type separator although any other type may be employed. The function of this separator is to permit the recovery of entrained liquids and solids from the effluent gases conducted to the separator from the reactor through pipe 38. The separated liquids and solids are returned through pipe 39 and a liquid level maintained in the separator by the liquid level control device 40. In operation the liquid level may be carried either in the upper portion of the reactor by the control device shown at 29 in which case level control 40 would be out of service or by the control in the separator when control 29 would be inoperative. If the liquid level is carried in the reactor less liquid will be carried out to the separator and recycled back to the reactor.

In operation rotation of the impeller in the bottom of the reactor or mixing vessel causes a circulation of liquid in a confined stream or ring flowing upwardly through the circulating tube and downwardly in the annular space between the circulating tube and reactor shell. During its passage upwardly through the circulating tube 11 the mixture is brought in intimate contact with gases discharged through perforations 18a in the lower ends of the gas distribution tubes. The circulation so established is of sufficient magnitude with respect to the reactor feed that when the reactants are introduced into the mass of circulating liquid the resulting temperature change caused by the heat of reaction will be very small, in the order of a fraction of a degree to 25° F., and preferably less than 5° F. The reactant gases are introduced into this large flowing stream, as previously suggested, through the gas distribution tubes 18 and a relatively high degree of distribution is obtained of the gas through the liquid body by means of small holes 18a drilled in the lower portion of the gas feed tubes or through screens or filters attached to the lower ends of the gas feed tubes used in place of the holes or perforations.

As an illustration of the operation of this process, consider the synthesis of hydrocarbons from carbon monoxide and hydrogen gases when utilizing a pulverized iron catalyst carried in suspension in a heavy liquid hydrocarbon oil. The reactor of the type shown is approximately 30 inches in diameter and contains a volume of iron-oil slurry in an amount of approximately 550 gallons. When fed with 70,000 cu. ft. per hour of a mixture of carbon monoxide and hydrogen gases there is produced approximately 1.75 barrels per hour of liquid hydrocarbon product. In addition to this fresh feed gas there will be some recycled gas and some contaminant gases, such as nitrogen, which do not enter into the reaction. Water is one of the products of the reaction and since the reaction is carried out at a pressure of approximately 400 pounds and at a temperature of 600° F., this water will pass out with the effluent gases as vapor.

The circulation rate of the slurry within the contactor in this test example is of the order of 3,000 G. P. M., and the exothermic heat of reaction is approximately 3,500,000 B. T. U. per hour. Even though all of this heat is released almost instantly at the point where the reactant gas initially meets the iron catalyst in the flowing slurry stream the quantity of this flowing slurry stream is such that the resultant temperature rise does not exceed 4° F. to 5° F. Obviously, by increasing or decreasing the amount of this flowing slurry stream the temperature rise at the point where reaction occurs will be correspondingly decreased or increased. For this reason a variable speed drive on the impeller is utilized to make possible varying the circulation rate with the feed rate.

Provision for adding liquid or slurry to the system and for withdrawing liquid or slurry is included in the design in the form of the liquid supply pipe 27 and slurry draw-off pipe 28. As suggested, to maintain the liquid or slurry level at the desired point the alternate liquid controls 29 and 40 are arranged to regulate the rate of withdrawal of liquid through pipe slurry draw-off 28. This control may also be effected by withdrawing slurry at a predetermined rate through line 28 and arranging the liquid level control to operate a valve in the liquid or slurry feed line. Thus, it will be seen that there has been provided by this apparatus a reactor or mixing device adapted to intimately contact reactant gases with a liquid or liquid solids suspension with provision for adding or removing heat by means of heat exchange media to obtain optimum reaction conditions.

From the foregoing it will be seen that this invention is one well adapted to attain all of the ends and objects hereinabove set forth together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. A mixing device for contacting gases and liquids or liquids plus solids, comprising a vessel, a circulating tube within the vessel, an impeller within the circulating tube, two sets of tube bundles supported within the vessel and extending into the circulating tube, the tubes of one set perforated for the discharge of gas, a supply pipe for feeding gas to the perforated tubes and inlet and discharge pipes for circulating a heat exchange medium through said second set of tubes, and inlet and discharge openings for introducing and withdrawing fluids from the vessel.

2. A mixing device as in claim 1, including a gas liquid separator, connections for passing liquids and gases to the separator, discharging product gases from the separator, and for returning liquid to the mixing chamber.

DAVID H. PUTNEY.

REFERENCES CITED

The following references are of record in the file of this patent:

UNITED STATES PATENTS

| Number | Name | Date |
| --- | --- | --- |
| 330,663 | Babbitt | Nov. 17, 1885 |
| 981,317 | Schlosser | Jan. 10, 1911 |
| 1,582,899 | Cassidy | May 4, 1926 |
| 1,988,766 | Aldridge | Jan. 22, 1935 |
| 2,121,332 | Barbieri | June 21, 1938 |
| 2,238,802 | Altshaler | Apr. 15, 1941 |